US009266545B2

(12) United States Patent
Robinson et al.

(10) Patent No.: US 9,266,545 B2
(45) Date of Patent: Feb. 23, 2016

(54) DOLLY FOR THE TRANSPORTATION OF SNOW SPORTS EQUIPMENT

(71) Applicants: Leslie Carol Robinson, Aurora, CO (US); Tony Lee Laugen, Aurora, CO (US)

(72) Inventors: Leslie Carol Robinson, Aurora, CO (US); Tony Lee Laugen, Aurora, CO (US)

( * ) Notice: Subject to any disclaimer, the term of this patent is extended or adjusted under 35 U.S.C. 154(b) by 0 days.

(21) Appl. No.: 14/685,542

(22) Filed: Apr. 13, 2015

(65) Prior Publication Data

US 2015/0291194 A1 Oct. 15, 2015

Related U.S. Application Data

(60) Provisional application No. 61/978,591, filed on Apr. 11, 2014.

(51) Int. Cl.
*B62B 1/04* (2006.01)
*B62B 1/12* (2006.01)
*B62B 1/14* (2006.01)
*B62B 1/06* (2006.01)

(52) U.S. Cl.
CPC . *B62B 1/12* (2013.01); *B62B 1/042* (2013.01); *B62B 1/06* (2013.01); *B62B 1/14* (2013.01)

(58) Field of Classification Search
CPC ..... A63B 55/08; A63B 55/081; A63B 55/082
See application file for complete search history.

(56) References Cited

U.S. PATENT DOCUMENTS 5,152,489 A * 10/1992 Christensen et al. ...... 248/311.2
8,282,121 B2 * 10/2012 Lin ............................... 280/651

* cited by examiner

*Primary Examiner* — Jeffrey J Restifo
*Assistant Examiner* — Erez Gurari (57) ABSTRACT

A dolly for the transportation of snow sports equipment is an apparatus that facilitates the transportation of snow equipment. The apparatus includes a storage assembly which is used secure items in need of transport. The storage assembly includes a pan, an open adjustable brace and a restraint which are all used to secure items to the apparatus. The storage assembly also includes a locking mechanism which is used to set the position of open adjustable brace. The storage assembly is connected along a support structure which is used to support leverage items held by the storage assembly during transportation. The support structure includes a spine, and a wheel assembly. The spine is used as the main supporting member for the apparatus. The wheel assembly is connected to the spine and facilitates the transportation of equipment. The handle is used to maneuver the entire apparatus during transportation.

19 Claims, 9 Drawing Sheets

DETAIL A

DOLLY FOR THE TRANSPORTATION OF SNOW SPORTS EQUIPMENT

The current application claims a priority to the U.S. Provisional Patent application Ser. No. 61/978,591 filed on Apr. 11, 2014. The current application is filed on Apr. 13, 2015 while Apr. 11, 2015 was on a weekend.

FIELD OF THE INVENTION

The present invention relates generally to dollies used for assisting in the transportation of objects or equipment. More specifically, the present invention is a two-wheeled dolly which is specifically designed to assist users in the transportation of snow sports equipment. The present invention allows users to pack equipment, tilt the present invention, and transport the equipment to a new location.

BACKGROUND OF THE INVENTION

Skiing, snowboarding, and other snow sports are very popular activities that require both a great deal of equipment and a considerable amount of energy to participate in. When partaking in any of these activates one may require a pair of skis, poles, snowboards, goggles, a helmet, gloves, as well as a host of other personal items. Carrying these items without any assisting devices can be difficult and exhausting. This problem is only exacerbated if users need to assist small children in carrying their equipment. Therefore, it is the object of the present invention to allow users to carry multiple sets of skis or snowboards, along with helmets and other snow sports related equipment with one device. The wheels will also allow the users to transport the equipment with much less effort on their part, leaving users with much more energy for the slopes. The present invention can also be used by guests or staff to transport gear around the premises for checking in, checking out, or any other reason they deem fit.

Users can obtain two additional benefits from the present invention. While not the intended use of the present invention, during the summer months, users may use the device to carry non-ski related objects such as trashcans or ice chests. There are also multiple places on the present invention for users to place advertisements.

DETAILED DESCRIPTION OF THE INVENTION

All illustrations of the drawings are for the purpose of describing selected versions of the present invention and are not intended to limit the scope of the present invention.

With reference to FIGS. 1-4, the present invention is a dolly for the transportation of snow sports equipment that may be used to secure and transport various items. The present invention comprises a storage assembly 1, a support structure 27, and a handle 38. The storage assembly 1 is primarily used for storing and securing snow sports equipment, but may also be used for other items. The storage assembly 1 comprises a pan 2, an open adjustable brace 6, a locking mechanism 17, and a restraint 22. The support structure 27 is used to distribute the weight of the items held by the storage assembly 1 and transport said items. The support structure 27 comprises a spine 28 and a wheel assembly 29. The spine 28 is a long shaft that acts as the main supporting member for the present invention. The pan 2 is used as platform for resting or stacking snow sports equipment and other objects upon. The handle 38 is used for pushing, pulling, or otherwise maneuvering the present invention. The pan 2 and the handle 38 are positioned opposite to each other along the spine 28. The wheel assembly 29 is used for providing an easy method of transporting objects stored on the present invention. The wheel assembly 29 is laterally mounted to the spine 28. The pan 2 and the wheel assembly 29 are positioned opposite to each other about the spine 28. Because of the configuration of the spine 27, the wheel assembly 29, and the pan 2, the user is able to leverage the items resting on the pan 2 upwards with the spine 27 by using the wheel assembly 29 as a fulcrum. The open adjustable brace 6 is used for storing objects and securing items placed on the pan 2. The open adjustable brace 6 is hingedly connected to the spine 28 between the handle 38 and the pan 2. Because the open adjustable brace 6 is hingedly connected to the spine 28, the open adjustable base 3 may be folded downward for easy storage. The open adjustable brace 6 is offset from the pan 2. The open adjustable brace 6 and the wheel assembly 29 are positioned opposite to each other about the spine 28. This allows the open adjustable brace 6 to further support the items resting on the pan 2. The locking mechanism 17 is used for securing the open adjustable brace 6 in an upward position, such that items and equipment may be secured to the present invention. The locking mechanism 17 is mechanically integrated into the hinged connection between the spine 28 and the open adjustable brace 6. The restraint 22 is used to further secure objects to the present invention, preventing said objects from shifting in any direction. The restraint 22 is laterally connected to the spine 28 in between the pan 2 and the open adjustable brace 6. The positioning of the restraint allows objects which do are not tall enough to reach the open adjustable brace 6 to be secured to the present invention.

Figure 5:
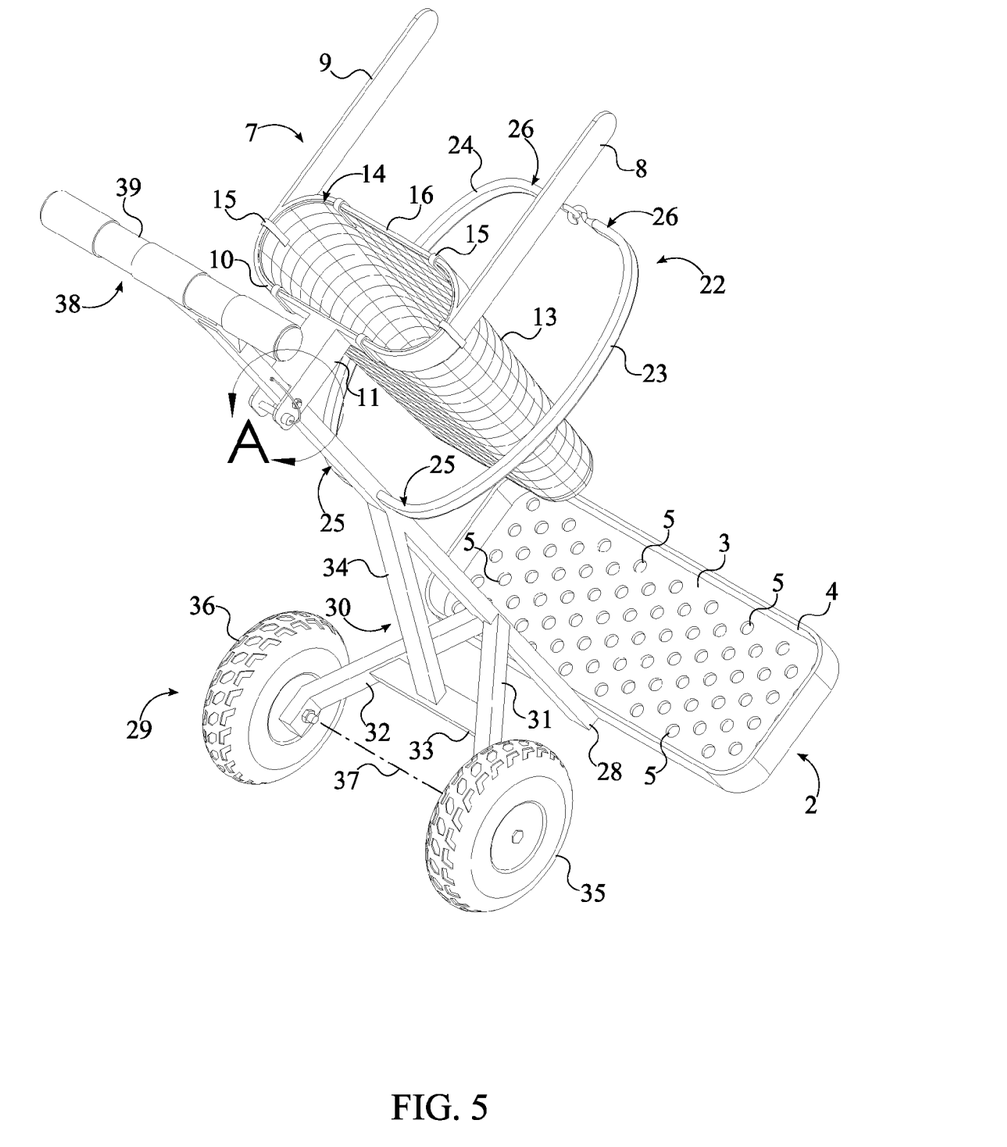
FIG. 5 is a back left perspective view of the present invention.

In reference to FIG. 5, the pan 2 comprises a base 3, a lateral portion 4, and a plurality of perforations 5. The base 3 acts as the main support platform for carrying snow sports equipment and other objects. The lateral portion 4 is perpendicularly and perimetrically connected to the base 3. The lateral portion 4 extends upwards from the base 3 and prevents objects from sliding or otherwise falling off of the base 3. The lateral portion 4 is externally connected to the spine 28, and the base 3 is positioned normal to the spine 28. The plurality of perforations 5 allows water to drain from the pan 2. The plurality of perforations 5 traverses through the base 3 and is distributed across the base 3. As snow melts, water drips down to the pan 2 and is able to drain through the plurality of perforations 5. Without the plurality of perforations 5, water would be able to collect inside the pan 2.

In reference to FIGS. 1-3 and 7-8, the open adjustable brace 6 comprises a U-bar 7 and an extension bar 11. The U-bar 7 is used to prevent objects from falling off of the present invention. Specifically, long objects, such as skis, snowboards, and ski poles are susceptible to shifting during transportation. The extension bar 11 is hingedly and laterally connected to the spine 28. The extension bar 11 offsets the U-bar 7 from the spine 28, allowing the U-bar 7 to rotate about the spine 28. The U-bar 7 comprises a first arm 8, a second arm 9, and a linkage web 10. The first arm 8 and the second arm 9 help to limit the degree to which objects are able to move and prevent said objects from falling off of the present invention. The linkage web 10 is adjacently connected to the extension bar 11, opposite the spine 28. The linkage web 10 acts as a bridge between the first arm 8 and the second arm 9. The first arm 8 and the second arm 9 are positioned opposite to each other along the linkage web 10. The positioning of the first arm 8 and the second arm 9 prevents items from falling off the sides of the present invention. The first arm 8 and the second arm 9 are positioned parallel to the extension bar 11 and perpendicular to the linkage web 10. The orientation of the first arm 8 and the second arm 9 prevents objects from tipping sideways off of the present invention. This is especially useful for transporting items over uneven terrain.

Figure 6:
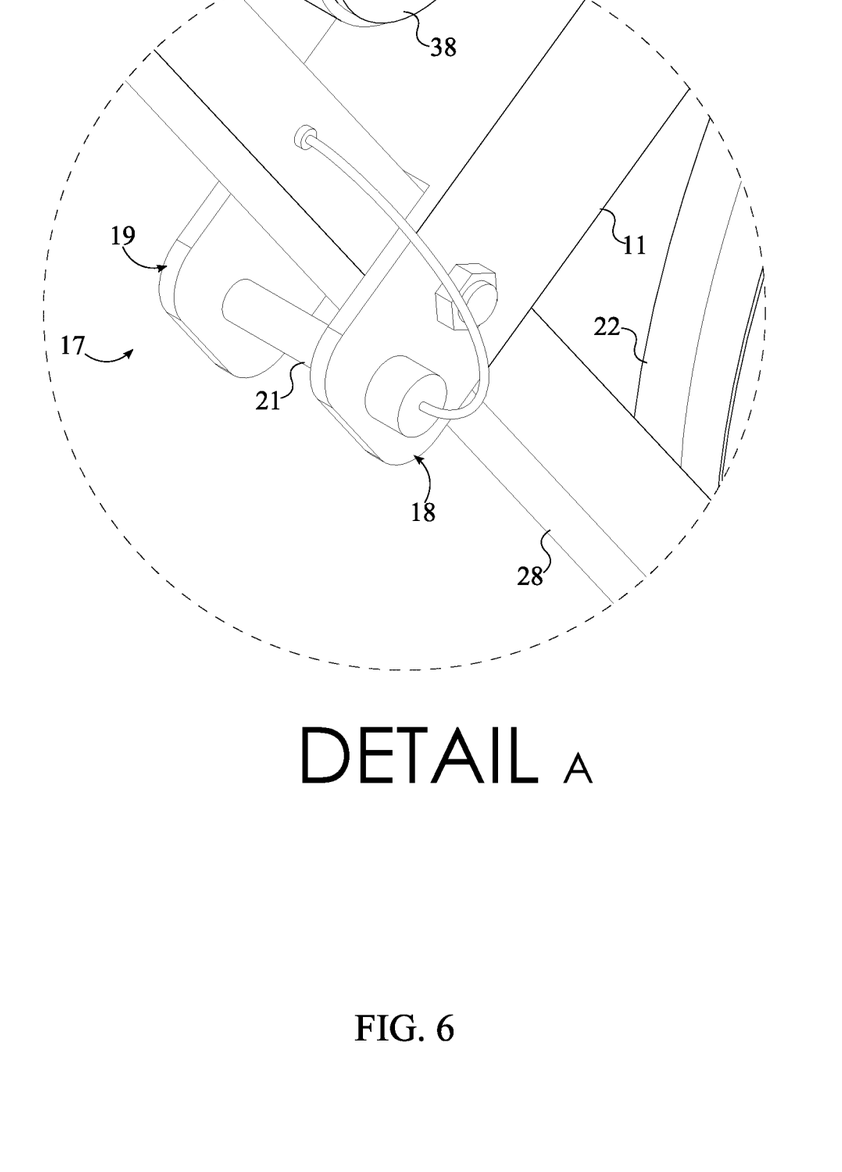
FIG. 6 is a detailed view of the present invention taken from the circle A in FIG. 5.
Figure 7:
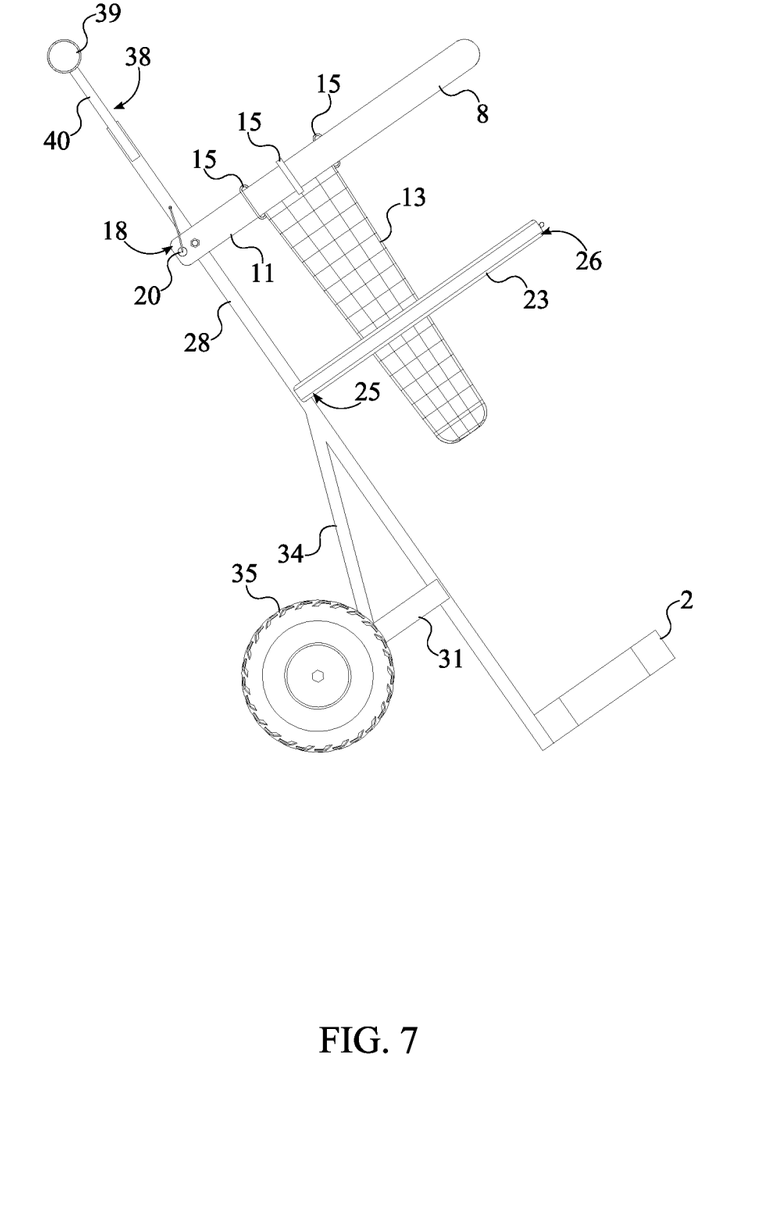
FIG. 7 is a left side view of the present invention with the open adjustable brace in an extended configuration.
Figure 8:
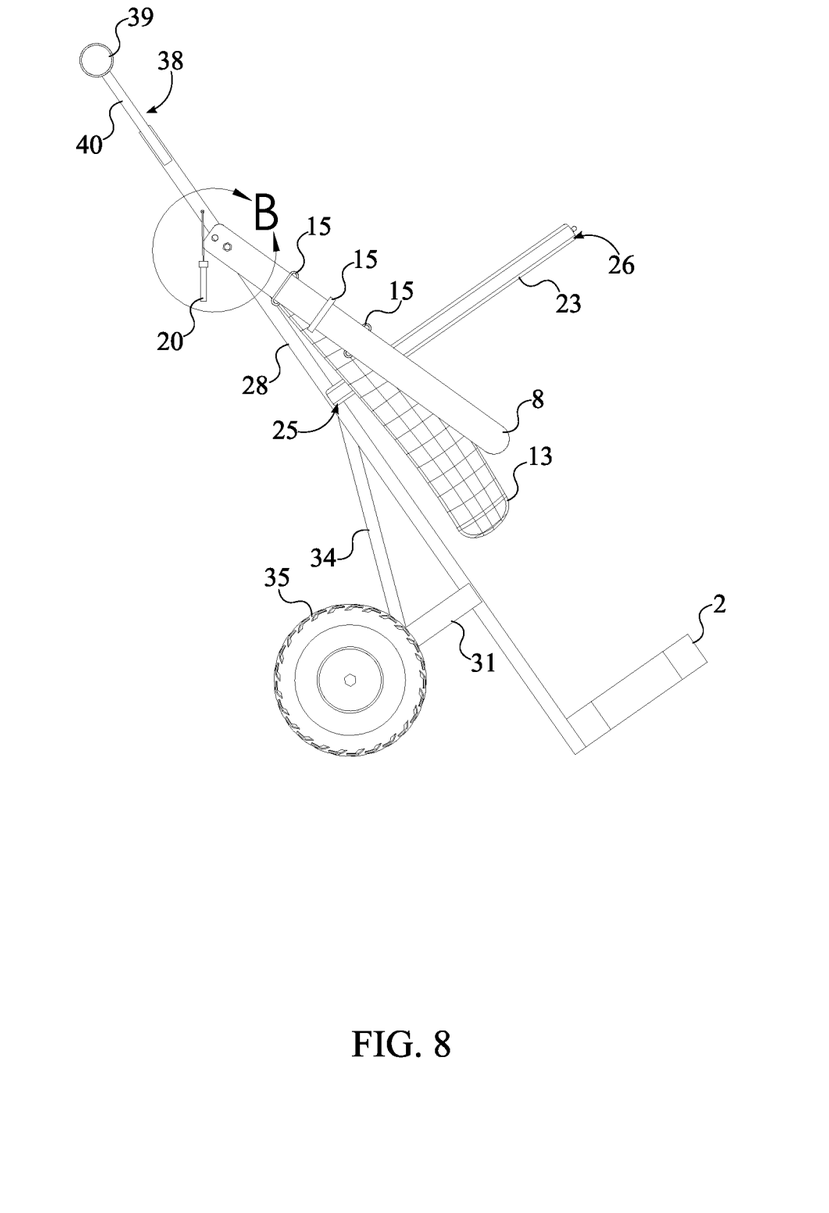
FIG. 8 is a left side view of the present invention with the open adjustable brace in a folded configuration.
Figure 9:
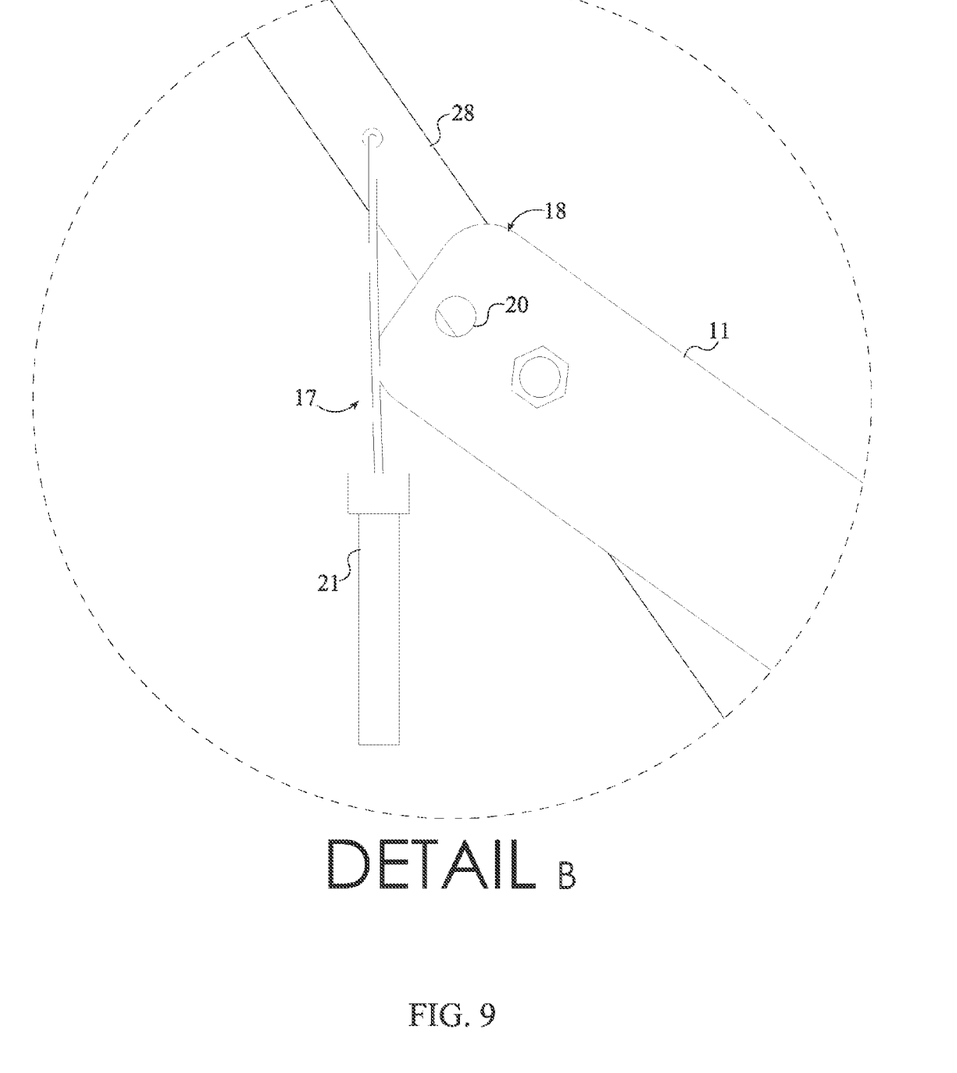
FIG. 9 is a detailed view of the present invention taken from the circle B in FIG. 8.

In reference to FIG. 6 and FIG. 9, the locking mechanism 17 comprises a first tab 18, a second tab 19, a pinhole 20 and a pin 21. The first tab 18 and the second tab 19 extend past the spine 28 and allow the extension bar 11 to be locked in place, without limiting the ability of the extension bar 11 to rotate. The first tab 18 and the second tab 19 are connected adjacent to the extension bar 11, opposite to the linkage web 10. The first tab 18 and the second tab 19 are positioned offset and parallel to each other. The first tab 18 and the second tab 19 are oriented such that the spine 28 is located in between the first tab 18 and the second tab 19. The pinhole 20 traverses through the first tab 18 and the second tab 19 and provides a means of engaging the pin 21 and locking the extension bar 11 in place. The pinhole 20 is positioned adjacent to the spine 28, opposite to the extension bar 11. When locking the extension bar 11 in place, the pinhole 20 is engaged by the pin 21. The pin 21 prevents the extension bar 11 from rotating by contacting the spine 28. In the preferred embodiment of the present invention, the pin 21 is tethered to the spine 28. This is done to prevent the pin 21 from getting lost when the open adjustable brace 6 is folded for storage.

Figure 3:
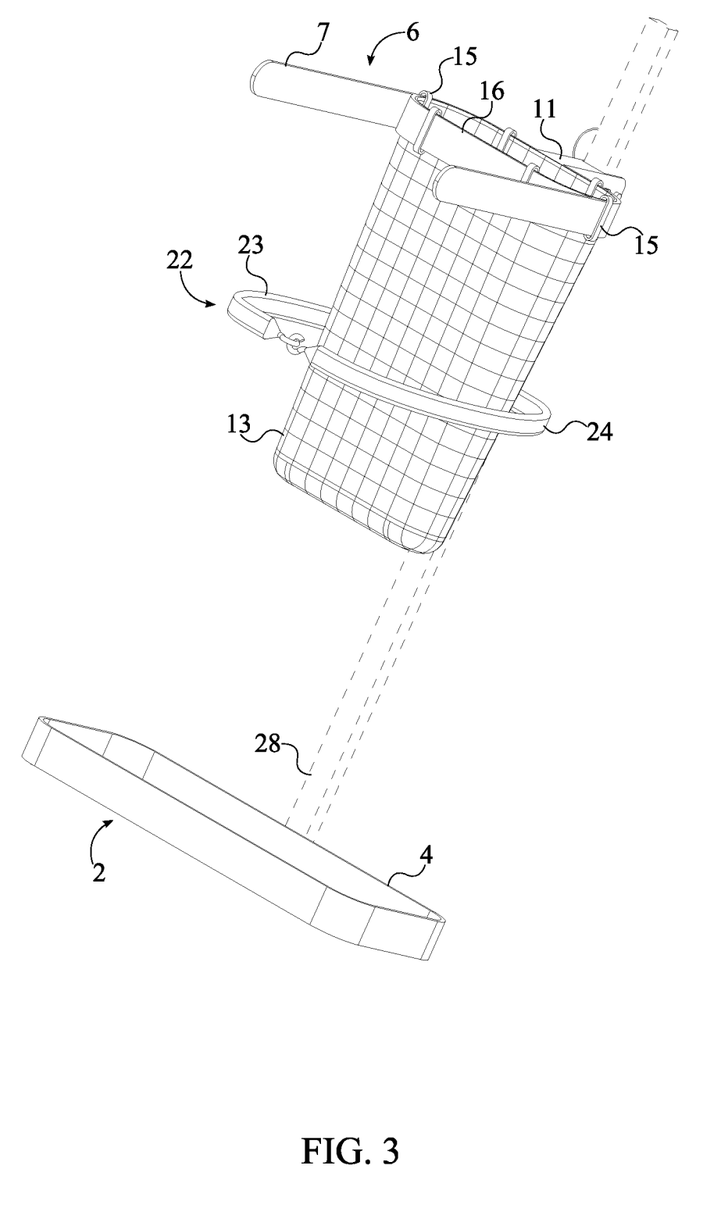
FIG. 3 is a front right perspective view of the present invention with the support structure removed except for the spine which is shown in dashed lines.

In reference to FIG. 3 and FIG. 5, the storage assembly 1 further comprises a bag 13, a crossbar 16, and a plurality of ties 15. The bag 13 is used as a secondary means of storage, specifically for smaller objects. In the preferred embodiment, the bag 13 is made from a mesh material. Such materials allow snow to melt and escape from the inside of the bag 13. Together with the linkage web 10, the crossbar 16 is used to support the bag 13 and hold the bag 13 open. The crossbar 16 is connected in between the first arm 8 and the second arm 9. A rim 14 of the bag 13 is perimetrically connected to the crossbar 16 and the linkage bar by the plurality of ties 15, which securably holds the bag open.

In reference to FIG. 5, the restraint 22 comprises a first strap 23 and a second strap 24. The first strap 23 and the second strap 24 may be wrapped around objects so that said objects may be secured to the present invention. It is preferred that the first strap 23 and the second strap 24 are both elastic; however, the first strap 23 and the second strap 24 may be made from non-elastic materials in alternative embodiments of the present invention. The first strap 23 and the second strap 24 each comprise a proximal end 25 and a distal end 26. The proximal end 25 of both the first strap 23 and the second strap 24 are pivotally connected to the spine 28. The proximal end 25 of the first strap 23 and the proximal end 25 of the second strap 24 are positioned adjacent to each other. The first strap 23 and the second strap 24 may be wrapped around objects and fastened or tied together. The distal end 26 of the first strap 23 is pivotally attached to the distal end 26 of the second strap 24. In the preferred embodiment, this is done through the use of locking hooks; however, snaps, Velcro, or any other method may be used to attach the first strap 23 to the second strap 24.

Figure 4:
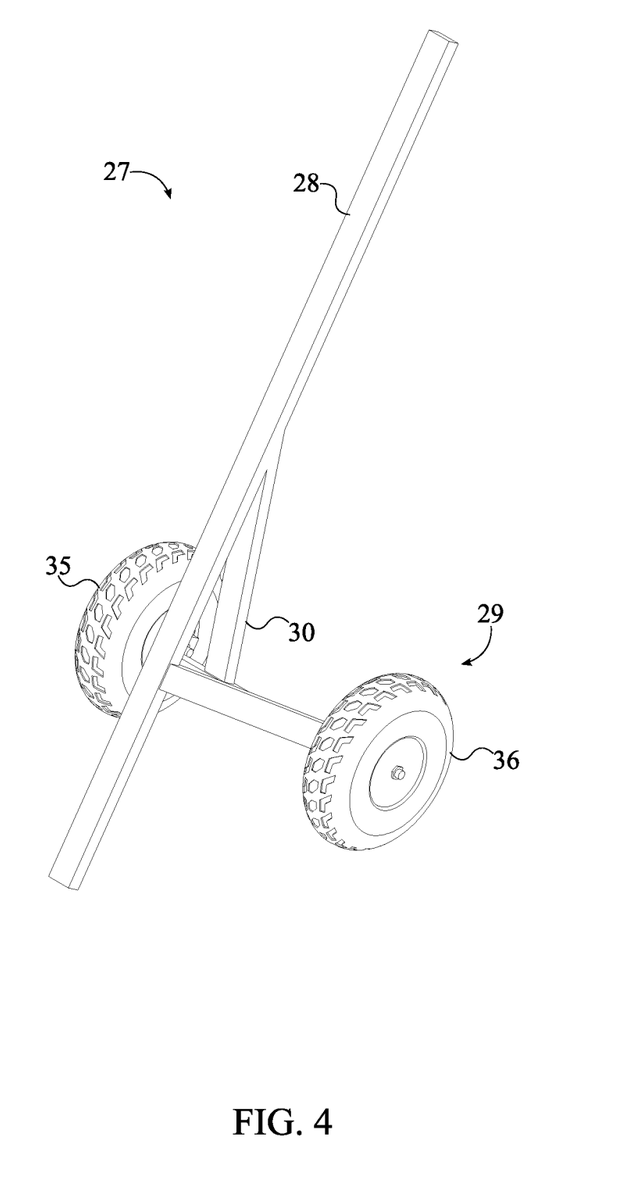
FIG. 4 is a front right perspective view of the present invention with the storage assembly removed.

In reference to FIGS. 4-5, the wheel assembly 29 comprises a wheel support frame 30, a first wheel 35, and a second wheel 36. The wheel support frame 30 is laterally connected to the spine 28 and is used to distribute the weight of items held by the storage assembly 1 onto the first wheel 35 and the second wheel 36. The first wheel 35 is rotatably and adjacently mounted to the wheel support frame 30. The second wheel 36 is rotatably and adjacently mounted to the wheel support frame 30, opposite to the first wheel 35. Both the first wheel 35 and the second wheel 36 are used to easily transport items held by the storage assembly 1. The first wheel 35 and the second wheel 36 are axially aligned with each other. This alignment is important in ensuring that the present invention is properly balanced and may be steered easily. The first wheel 35 and the second wheel 36 are positioned offset from the spine 28 by the wheel support frame 30. Because the first wheel 35 and the second wheel 36 are offset from the spine 28, less effort is required to tip the present invention to the point where the present invention may be transported. When kept stationary, the present invention is oriented such that the first wheel 35, the second wheel 36, and the pan 2 contact the ground. During transportation, the present invention is tipped with the wheel assembly 29 as the pivot point such that the pan 2 is elevated off of the ground.

The wheel support frame 30 comprises a first lateral support 31, a second lateral support 32, a bridging support 33, and a vertical support 34. The first lateral support 31 is laterally connected to the spine 28. The second lateral support 32 is laterally connected to the spine 28. Both the first lateral support 31 and the second lateral support 32 are used to offset the first wheel 35 and the second wheel 36 from the spine 28. This is done to make transporting the present invention easier for the user. The first wheel 35 is rotatably connected to the first lateral support 31, opposite the spine 28. The second wheel 36 is rotatably connected to the second lateral support 32, opposite the spine 28. Because the first wheel 35 and the second wheel 36 are offset from the spine 28 by the first lateral support 31 and the second lateral support 32, the present invention rests at an angle, which is easier to maneuver than a conventional dolly. The bridging support 33 is connected in between the first lateral support 31 and the second lateral support 32. The bridging support 33 is used to maintain a proper alignment of the first lateral support 31 and the second lateral support 32. The bridging support 33 is also used to improve the structural integrity of the present invention. The vertical support 34 is connected in between the spine 28 and the bridging support 33. The vertical support 34 is used to help distribute the weight of items held by the storage assembly 1.

Figure 1:
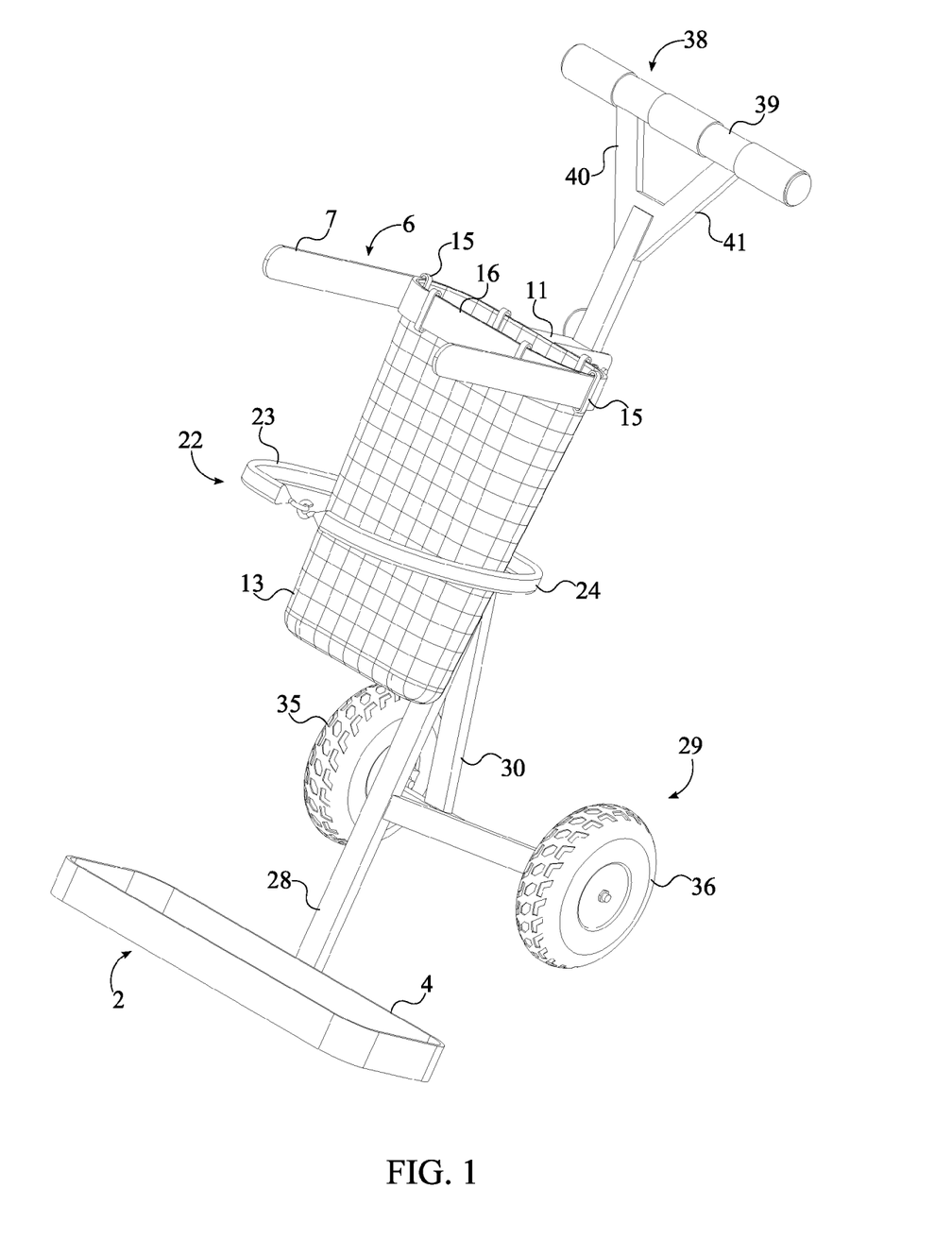
FIG. 1 is a front right perspective view of the present invention.
Figure 2:
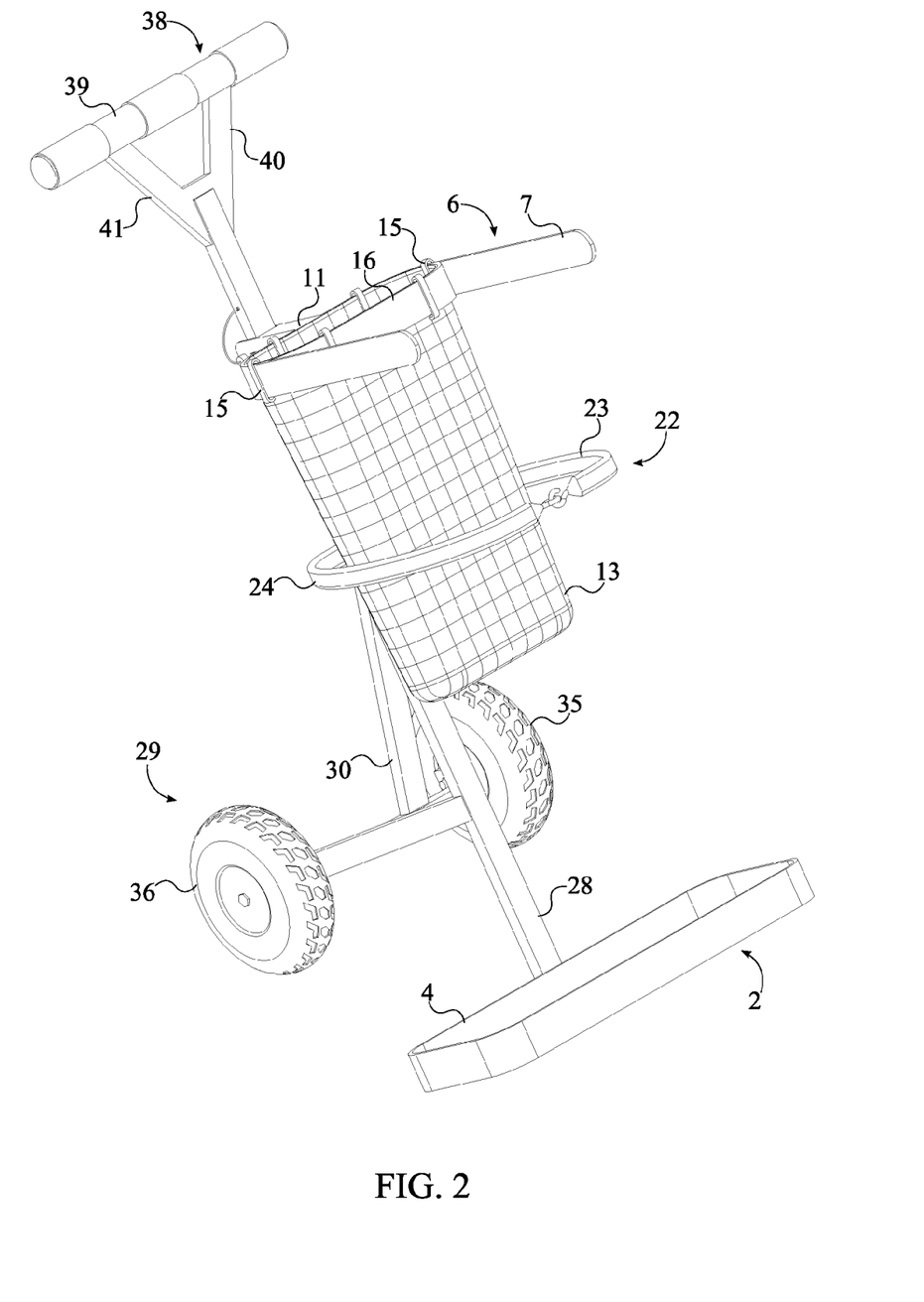
FIG. 2 is a front left perspective view of the present invention.

In reference to FIG. 1 and FIG. 2, the handle 38 comprises a first support 40, a second support 41, and a handlebar 39. The handlebar 39 is positioned perpendicular to the spine 28. The handlebar 39 allows the user to easily maneuver the present invention. After tipping the present invention to an angle suitable for transportation, the present invention may be pushed or pulled by the handlebar 39. The handlebar 39 is aligned parallel to a wheel rotation axis 37 of the wheel assembly 29. The handlebar 39 is connected adjacent to the spine 28 by the first support 40 and the second support 41. The first support 40 and the second support 41 are oriented at an offset angle from each other. Because the first support 40 and the second support 41 are oriented at an angle, helmets and other items may be secured between the handlebar 39 and the spine 28. Alternatively, such items may be secured between the handle 38 and the open adjustable brace 6. In the preferred embodiment of the present invention, a plurality of grips are placed about the handlebar 39 to make the handlebar 39 more comfortable to grasp.

Although the invention has been explained in relation to its preferred embodiment, it is to be understood that many other possible modifications and variations can be made without departing from the spirit and scope of the invention as hereinafter claimed.

What is claimed is:

1. A dolly for the transportation of snow sports equipment comprises:
    a storage assembly;
    a support structure;
    a handle;
    the storage assembly comprises a pan, an open adjustable brace, a locking mechanism and a restraint;
    the support structure comprises a spine and a wheel assembly;
    the pan and the handle being positioned opposite to each other along the spine;
    the wheel assembly being laterally mounted to the spine;
    the pan and the wheel assembly being positioned opposite to each other about the spine;
    the open adjustable brace being hingedly connected to the spine between the handle and the pan;
    the open adjustable brace being offset from the pan;
    the open adjustable brace and the wheel assembly being positioned opposite to each other about the spine;
    the locking mechanism being mechanically integrated into the hinged connection between the spine and the open adjustable brace;
    the restraint being laterally connected to the spine proximate the pan and the open adjustable brace:
    the pan comprises a base, a lateral portion, and a plurality of perforations;
    the lateral portion being perpendicularly and perimetrically connected to the base;
    the spine being externally connected to the lateral portion;
    the base being positioned normal to the spine;
    the plurality of perforations traversing through the base; and
    the plurality of perforations being distributed across the base.

2. The dolly for the transportation of snow sports equipment as claimed in claim 1 comprises:
    the open adjustable brace comprises a U-bar and an extension bar;
    the U-bar comprises a first arm, a second arm, and a linkage web;
    the extension bar being hingedly and laterally connected to the spine;
    the linkage web being adjacently connected to the extension bar, opposite the spine;
    the first arm and the second arm being positioned opposite to each other along the linkage web;
    the first arm and the second arm being positioned opposite to the extension bar about the linkage web; and
    the first arm and the second arm being positioned parallel to the extension bar and perpendicular to the linkage web.

3. The dolly for the transportation of snow sports equipment as claimed in claim 2 comprises:
    the locking mechanism comprises a first tab, a second tab, a pinhole, and a pin;
    the first tab and the second tab being connected adjacent to the extension bar, opposite to the linkage web;
    the first tab and the second tab being positioned offset and parallel to each other;
    the spine being located proximate the first tab and the second tab;
    the pinhole traversing through the first tab and the second tab;
    the pinhole being positioned adjacent to the spine, opposite to the extension bar; and
    the pinhole being engaged by the pin.

4. The dolly for the transportation of snow sports equipment as claimed in claim 2 comprises:
    the storage assembly further comprises a bag, a crossbar, and a plurality of ties;
    the crossbar being connected proximate the first arm and the second arm; and
    a rim of the bag being perimetrically connected to the crossbar and the linkage bar by the plurality of ties.

5. The dolly for the transportation of snow sports equipment as claimed in claim 1 comprises:
    the restraint comprises a first strap and a second strap;
    the first strap and the second strap each comprise a proximal end and a distal end;
    the proximal end of both the first strap and the second strap being pivotally connected to the spine;
    the proximal end of the first strap and the proximal end of the second strap being positioned adjacent to each other; and
    the distal end of the first strap being pivotally attached to the distal end of the second strap.

6. The dolly for the transportation of snow sports equipment as claimed in claim 1 comprises:
    the wheel assembly comprises a wheel support frame, a first wheel, and a second wheel;
    the wheel support frame being laterally connected to the spine;
    the first wheel being rotatably and adjacently mounted to the wheel support frame;
    the second wheel being rotatably and adjacently mounted to the wheel support frame, opposite to the first wheel;
    the first wheel and the second wheel being axially aligned with each other; and
    the first wheel and the second wheel being positioned offset from the spine by the wheel support frame.

7. The dolly for the transportation of snow sports equipment as claimed in claim 6 comprises:
    the wheel support frame comprises a first lateral support, a second lateral support, a bridging support, and a vertical support;
    the first lateral support being laterally connected to the spine,
    the second lateral support being laterally connected to the spine;
    the first wheel being rotatably connected to the first lateral support, opposite the spine;
    the second wheel being rotatably connected to the second lateral support, opposite the spine;
    the bridging support being connected to the first lateral support and the second lateral support; and the vertical support being connected to the spine and the bridging support.

8. The dolly for the transportation of snow sports equipment as claimed in claim 1 comprises:
the handle comprises a first support, a second support, and a handlebar;
the handlebar being positioned perpendicular to the spine;
the handlebar being aligned parallel to a wheel rotation axis of the wheel assembly;
the handlebar being connected adjacent to the spine by the first support and the second support; and
the first support and the second support being oriented at an offset angle from each other.

9. A dolly for the transportation of snow sports equipment comprises:
a storage assembly;
a support structure;
a handle;
the storage assembly comprises a pan, an open adjustable brace, a locking mechanism and a restraint;
the support structure comprises a spine and a wheel assembly;
the open adjustable brace comprises a U-bar and an extension bar;
the U-bar comprises a first arm, a second arm, and a linkage web;
the pan and the handle being positioned opposite to each other along the spine;
the wheel assembly being laterally mounted to the spine;
the pan and the wheel assembly being positioned opposite to each other about the spine;
the open adjustable brace being hingedly connected to the spine between the handle and the pan;
the open adjustable brace being offset from the pan;
the open adjustable brace and the wheel assembly being positioned opposite to each other about the spine;
the locking mechanism being mechanically integrated into the hinged connection between the spine and the open adjustable brace;
the restraint being laterally connected to the spine proximate the pan and the open adjustable brace;
the extension bar being hingedly and laterally connected to the spine;
the linkage web being adjacently connected to the extension bar, opposite the spine;
the first arm and the second arm being positioned opposite to each other along the linkage web;
the first arm and the second arm being positioned opposite to the extension bar about the linkage web; and
the first arm and the second arm being positioned parallel to the extension bar and perpendicular to the linkage web.

10. The dolly for the transportation of snow sports equipment as claimed in claim 9 comprises:
the pan comprises a base, a lateral portion, and a plurality of perforations;
the lateral portion being perpendicularly and perimetrically connected to the base;
the spine being externally connected to the lateral portion;
the base being positioned normal to the spine;
the plurality of perforations traversing through the base; and
the plurality of perforations being distributed across the base.

11. The dolly for the transportation of snow sports equipment as claimed in claim 9 comprises:
the locking mechanism comprises a first tab, a second tab, a pinhole, and a pin;
the storage assembly further comprises a bag, a crossbar, and a plurality of ties;
the first tab and the second tab being connected adjacent to the extension bar, opposite to the linkage web;
the first tab and the second tab being positioned offset and parallel to each other;
the spine being located proximate the first tab and the second tab;
the pinhole traversing through the first tab and the second tab;
the pinhole being positioned adjacent to the spine, opposite to the extension bar;
the pinhole being engaged by the pin;
the crossbar being connected to the first arm and the second arm; and
a rim of the bag being perimetrically connected to the crossbar and the linkage bar by the plurality of ties.

12. The dolly for the transportation of snow sports equipment as claimed in claim 9 comprises:
the restraint comprises a first strap and a second strap;
the first strap and the second strap each comprise a proximal end and a distal end;
the proximal end of both the first strap and the second strap being pivotally connected to the spine;
the proximal end of the first strap and the proximal end of the second strap being positioned adjacent to each other; and
the distal end of the first strap being pivotally attached to the distal end of the second strap.

13. The dolly for the transportation of snow sports equipment as claimed in claim 9 comprises:
the wheel assembly comprises a wheel support frame, a first wheel, and a second wheel;
the wheel support frame comprises a first lateral support, a second lateral support, a bridging support, and a vertical support;
the wheel support frame being laterally connected to the spine;
the first wheel being rotatably and adjacently mounted to the wheel support frame;
the second wheel being rotatably and adjacently mounted to the wheel support frame, opposite to the first wheel;
the first wheel and the second wheel being axially aligned with each other;
the first wheel and the second wheel being positioned offset from the spine by the wheel support frame;
the first lateral support being laterally connected to the spine,
the second lateral support being laterally connected to the spine;
the first wheel being rotatably connected to the first lateral support, opposite the spine;
the second wheel being rotatably connected to the second lateral support, opposite the spine;
the bridging support being connected to the first lateral support and the second lateral support; and
the vertical support being connected to the spine and the bridging support.

14. The dolly for the transportation of snow sports equipment as claimed in claim 9 comprises:
the handle comprises a first support, a second support, and a handlebar;
the handlebar being positioned perpendicular to the spine;
the handlebar being aligned parallel to a wheel rotation axis of the wheel assembly;
the handlebar being connected adjacent to the spine by the first support and the second support; and the first support and the second support being oriented at an offset angle from each other.

15. A dolly for the transportation of snow sports equipment comprises:
   a storage assembly;
   a support structure;
   a handle;
   the storage assembly comprises a pan, an open adjustable brace, a locking mechanism and a restraint, a bag, a crossbar, and a plurality of ties;
   the support structure comprises a spine and a wheel assembly;
   the open adjustable brace comprises a U-bar and an extension bar;
   the U-bar comprises a first arm, a second arm, and a linkage web;
   the pan and the handle being positioned opposite to each other along the spine;
   the wheel assembly being laterally mounted to the spine;
   the pan and the wheel assembly being positioned opposite to each other about the spine;
   the open adjustable brace being hingedly connected to the spine between the handle and the pan;
   the open adjustable brace being offset from the pan;
   the open adjustable brace and the wheel assembly being positioned opposite to each other about the spine;
   the locking mechanism being mechanically integrated into the hinged connection between the spine and the open adjustable brace;
   the restraint being laterally connected to the spine proximate the pan and the open adjustable brace;
   the extension bar being hingedly and laterally connected to the spine;
   the linkage web being adjacently connected to the extension bar, opposite the spine;
   the first arm and the second arm being positioned opposite to each other along the linkage web;
   the first arm and the second arm being positioned opposite to the extension bar about the linkage web;
   the first arm and the second arm being positioned parallel to the extension bar and perpendicular to the linkage web;
   the crossbar being connected to the first arm and the second arm; and
   a rim of the bag being perimetrically connected to the crossbar and the linkage bar by the plurality of ties.

16. The dolly for the transportation of snow sports equipment as claimed in claim 15 comprises:
   the pan comprises a base, a lateral portion, and a plurality of perforations;
   the handle comprises a first support, a second support, and a handlebar;
   the lateral portion being perpendicularly and perimetrically connected to the base;
   the spine being externally connected to the lateral portion;
   the base being positioned normal to the spine;
   the plurality of perforations traversing through the base;
   the plurality of perforations being distributed across the base;
   the handlebar being positioned perpendicular to the spine;
   the handlebar being aligned parallel to a wheel rotation axis of the wheel assembly;
   the handlebar being connected adjacent to the spine by the first support and the second support; and
   the first support and the second support being oriented at an offset angle from each other.

17. The dolly for the transportation of snow sports equipment as claimed in claim 15 comprises:
   the locking mechanism comprises a first tab, a second tab, a pinhole, and a pin;
   the first tab and the second tab being connected adjacent to the extension bar, opposite to the linkage web;
   the first tab and the second tab being positioned offset and parallel to each other;
   the spine being located proximate the first tab and the second tab;
   the pinhole traversing through the first tab and the second tab;
   the pinhole being positioned adjacent to the spine, opposite to the extension bar; and
   the pinhole being engaged by the pin.

18. The dolly for the transportation of snow sports equipment as claimed in claim 15 comprises:
   the restraint comprises a first strap and a second strap;
   the first strap and the second strap each comprise a proximal end and a distal end;
   the proximal end of both the first strap and the second strap being pivotally connected to the spine;
   the proximal end of the first strap and the proximal end of the second strap being positioned adjacent to each other; and
   the distal end of the first strap being pivotally attached to the distal end of the second strap.

19. The dolly for the transportation of snow sports equipment as claimed in claim 9 comprises:
   the wheel assembly comprises a wheel support frame, a first wheel, and a second wheel;
   the wheel support frame comprises a first lateral support, a second lateral support, a bridging support, and a vertical support;
   the wheel support frame being laterally connected to the spine;
   the first wheel being rotatably and adjacently mounted to the wheel support frame;
   the second wheel being rotatably and adjacently mounted to the wheel support frame, opposite to the first wheel;
   the first wheel and the second wheel being axially aligned with each other;
   the first wheel and the second wheel being positioned offset from the spine by the wheel support frame;
   the first lateral support being laterally connected to the spine,
   the second lateral support being laterally connected to the spine;
   the first wheel being rotatably connected to the first lateral support, opposite the spine;
   the second wheel being rotatably connected to the second lateral support, opposite the spine;
   the bridging support being connected to the first lateral support and the second lateral support; and
   the vertical support being connected to the spine and the bridging support.

* * * * *